(12) United States Patent
Dickinson et al.

(10) Patent No.: US 9,597,976 B2
(45) Date of Patent: Mar. 21, 2017

(54) INTEGRATED BATTERY UNIT WITH COOLING AND PROTECTION EXPEDIENTS FOR ELECTRIC VEHICLES

(71) Applicant: AEROVIRONMENT, INC., Monrovia, CA (US)

(72) Inventors: Blake E. Dickinson, Monrovia, CA (US); Larry Hayashigawa, Orange, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 36 days.

(21) Appl. No.: 14/468,279

(22) Filed: Aug. 25, 2014

(65) Prior Publication Data

US 2015/0115890 A1    Apr. 30, 2015

Related U.S. Application Data

(63) Continuation of application No. 11/186,730, filed on Jul. 20, 2005, now Pat. No. 8,816,645.

(51) Int. Cl.
*H02J 7/00* (2006.01)
*B60L 11/18* (2006.01)
(Continued)

(52) U.S. Cl.
CPC ......... *B60L 11/1874* (2013.01); *B60L 11/185* (2013.01); *H01M 2/1077* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS

| 5,082,075 A | 1/1992 | Karolek et al. |
| 5,204,609 A | 4/1993 | Alisauski |

(Continued)

FOREIGN PATENT DOCUMENTS

| DE | 19924529 A1 | 11/2000 |
| EP | 0964470 A1 | 12/1999 |

(Continued)

OTHER PUBLICATIONS

"48-Volt Champion With Active Cooling Class 1 Sit Down Rider Battery," GNB Industrial Power A Division of EXIDE, Champion, http://industrialenergy.exide.com/gnbmp/pdf/GB-3985-06-04.pdf, (Jan. 18, 2007), pp. 2.

(Continued)

*Primary Examiner* — Arun Williams
(74) *Attorney, Agent, or Firm* — Nixon Peabody, LLP; Eric Aagaard

(57) ABSTRACT

Methods of and apparatus for removing heat generated by cells of a battery pack. The methods and apparatus may employ one or more fan modules disposed between or next to cells of the battery pack, or one or more fans directly mounted to the battery pack or battery pack case housing the cells. Further, a motor controller isolation system operates to electrically isolate the motor controller of the electric vehicle when the battery pack is being charged. The motor controller isolation system may be integrated with the integrated battery pack and thermal and ventilation system. The integrated system, or "integrated battery unit (IBU)," is preferably manufactured in a manner that requires no, modifications to the electric vehicle in which the IBU is installed.

14 Claims, 21 Drawing Sheets

(51) Int. Cl.
*H01M 2/10* (2006.01)
*H01M 10/625* (2014.01)
*H01M 10/6563* (2014.01)
*H01M 10/6557* (2014.01)
*H01M 10/613* (2014.01)
*H01M 10/46* (2006.01)
*H01M 10/63* (2014.01)

(52) U.S. Cl.
CPC ....... *H01M 10/613* (2015.04); *H01M 10/625* (2015.04); *H01M 10/6557* (2015.04); *H01M 10/6563* (2015.04); *H01M 10/46* (2013.01); *H01M 10/63* (2015.04); *Y02E 60/12* (2013.01)

(58) Field of Classification Search
USPC ....................................................... 320/109
See application file for complete search history.

(56) References Cited

U.S. PATENT DOCUMENTS

| | | |
|---|---|---|
| 5,441,824 A | 8/1995 | Rippel |
| 5,490,572 A | 2/1996 | Tajiri et al. |
| 5,496,389 A | 3/1996 | Wilcox |
| 5,567,542 A | 10/1996 | Bae |
| 5,721,064 A | 2/1998 | Pedicini et al. |
| 5,866,276 A | 2/1999 | Ogami et al. |
| 5,941,314 A * | 8/1999 | Weinmeister ............ A62C 8/00 169/48 |
| 6,049,191 A | 4/2000 | Terazoe et al. |
| 6,218,796 B1 | 4/2001 | Kozlowski |
| 6,281,660 B1 * | 8/2001 | Abe ....................... B60K 6/543 320/103 |
| 6,340,877 B1 | 1/2002 | Mita et al. |
| 6,448,741 B1 | 9/2002 | Inui et al. |
| 6,936,767 B2 | 8/2005 | Kleinecke et al. |
| 6,942,944 B2 | 9/2005 | Al-Hallaj et al. |
| 6,946,216 B2 | 9/2005 | Mu-Tsai et al. |
| 6,955,055 B2 | 10/2005 | Ebermann |
| 7,004,233 B2 | 2/2006 | Hasegawa et al. |
| 7,045,236 B1 | 5/2006 | Andrew et al. |
| 7,079,379 B2 | 7/2006 | Yamaguchi et al. |
| 2002/0085355 A1 | 7/2002 | Oda et al. |
| 2003/0054230 A1 | 3/2003 | Al-Hallaj et al. |
| 2003/0082438 A1 | 5/2003 | Kwon |
| 2003/0087148 A1 | 5/2003 | Minamiura |
| 2004/0061480 A1 * | 4/2004 | Kimura .................. H01M 6/50 320/150 |
| 2004/0100225 A1 * | 5/2004 | Neil ....................... B60L 1/003 320/109 |
| 2005/0269986 A1 | 12/2005 | Peng |

FOREIGN PATENT DOCUMENTS

| | | |
|---|---|---|
| EP | 1026770 A1 | 8/2000 |
| FR | 2745422 A1 | 8/1997 |

OTHER PUBLICATIONS

48-Volt Champion With Active Cooling Class 1 Sit Down Rider Battery Specifications, http://industrialenergy.exide.comignbmp/pdf/GB-3985-06-04.pdf, (Jan. 18, 2007), p. 1.

"Exide Technologies—The Industry Leader," GNB Industrial Power A Division of EXIDE, Champion, IA)://industrialeneray.exide.com/gnbmp/pdf/GB-3985-06-04.pdf, (Jan. 18, 2007), p. 1.

* cited by examiner

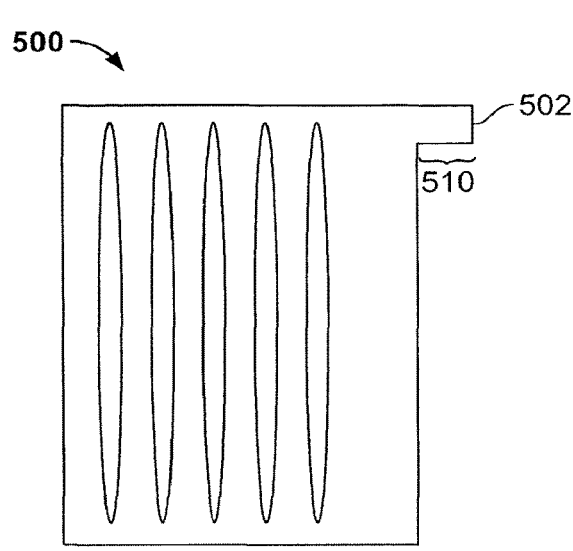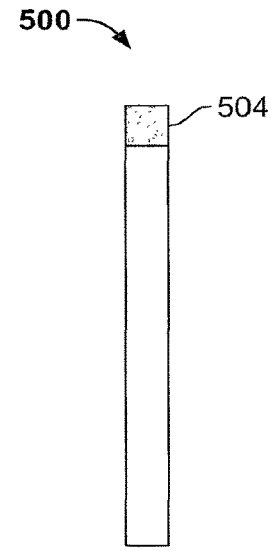
FIG. 5A
FIG. 5B
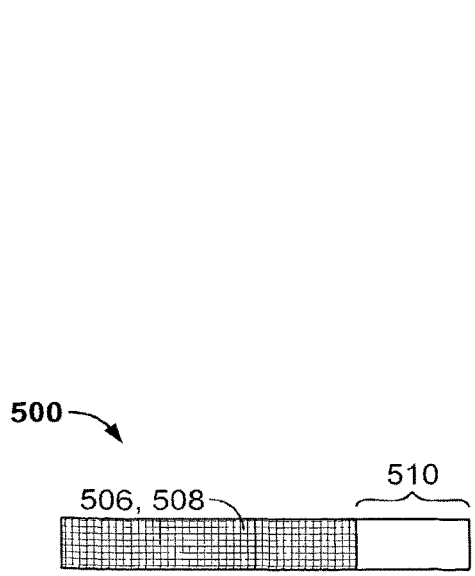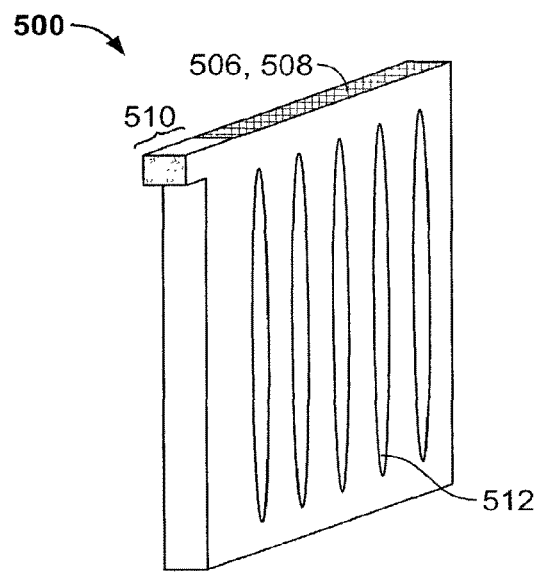
FIG. 5C
FIG. 5D

FIG. 15A  FIG. 15B

INTEGRATED BATTERY UNIT WITH COOLING AND PROTECTION EXPEDIENTS FOR ELECTRIC VEHICLES

RELATED PATENT APPLICATIONS

This application is a continuation of U.S. patent application Ser. No. 11/186,730, now U.S. Pat. No. 8,816,645, titled INTEGRATED BATTERY UNIT WITH COOLING AND PROTECTION EXPEDIENTS FOR ELECTRIC VEHICLES, filed Jul. 20, 2005, the contents of which are incorporated herein by reference in their entirety.

FIELD OF THE INVENTION

The present invention relates to electric vehicles. More specifically, the present invention relates to adapting electric vehicles for fast charging technology, and to providing thermal and ventilation management for battery packs used in electric vehicles.

BACKGROUND OF THE INVENTION

Recreational and industrial vehicles are prevalent in today's world. Examples include golf carts, forklifts, and airport transport and luggage handling carts. Because electric vehicles create less pollution than internal combustion (i.e., gasoline and diesel powered) vehicles, they are an environmentally friendly, and increasingly acceptable, alternative.

As shown in FIG. 1, electric vehicles are typically powered by a battery pack comprised of a plurality of rechargeable batteries (or "cells") 100. The battery pack cells 100 are housed in a battery pack case (or "tray") 102. The cells 100 are usually connected in series by way of electrical connectors 104. The battery pack case 102 is typically semi-permanently mounted on or inside the electric vehicle.

A necessary operational aspect of electric vehicles is the periodic recharging of the battery pack. In some applications the battery pack may be recharged without having to remove the battery pack from the vehicle. However, in other applications the depleted battery pack must be removed and replaced with a fully charged replacement battery pack. In factory operations, for example, the electric vehicles (typically forklifts) are powered by high-capacity batteries. High-capacity batteries have amp-hour ratings of 1000 Amp-hrs or more, and require six to eight hours of charging to restore the battery to full charge. Hence, to avoid rendering the vehicle unavailable for use during the six to eight hours needed to recharge the depleted battery pack, the depleted battery pack is typically lifted out of the vehicle and replaced with a fully charged replacement pack. Because the battery packs can weight up to 4,000 lbs, special hydraulically powered lift machines are used to complete the battery pack swapping operation.

In recent years, engineers have developed what is known as "fast charging" technology. Fast charging reduces the recharge time of a 1000 Amp-hr battery, from the typical six to eight hours required using conventional battery charging techniques, to about an hour. Fast charging thereby allows recharging to be performed, for example, during an operator's lunch break, or during other opportune times when the vehicle may not be needed. For this reason, fast charging technology is sometimes referred to as "opportunity charging". Fast charging also eliminates the need to repeatedly swap out and replace depleted battery packs with charged battery packs.

While fast charging improves operational efficiencies, its use generates temperatures and thermal gradients in a battery pack, which if not properly controlled contribute to degraded performance and a shortened lifespan of the battery pack. FIG. 2 shows a graph of the effective internal resistance and heat generation observed in a typical thirty-six-volt industrial battery at different inrush currents and states of charge (SOC). The "Fast Charge Zone," which is defined by the lowest resistance region, is located between about 20 and 70% SOC. The graph shows that in the Fast Charge Zone, fast charging at 600 amps generates up to ten times as much heating as conventional charging at 200 amps. This excessive heating results in significantly higher temperatures in the fast charged battery pack.

Heating of cells of a battery pack, whether attributable to fast charging or heavy-load use, is exacerbated by the fact that the various cells of the battery pack are typically arranged in a grid pattern and housed in a battery pack case, similar to that shown in FIG. 1. This substantially enclosed configuration does not allow for any significant cooling paths, especially for cells disposed in the center of the pack. While the cells closest to the metal case can cool to some extent through the case wall, the center cells have to cool through their neighbor cells or by radiating heat from their top surfaces.

Because the center cells of a battery pack endure higher temperatures than cells forming the periphery of the battery pack, the center cells are plagued with diminished performance and are even prone to fail more often compared to the peripheral cells. FIG. 3A shows cell voltages of a battery pack of eighteen cells (which are arranged as shown in FIG. 3B) during discharge at 20% SOC, before and after equalization (EQ) of a battery pack that has undergone fast charging during a life cycle test. Overall, it is seen that the cell voltages of all cells are higher after EQ compared to before EQ. However, even after EQ the cell voltages of the "middle-cell group," which comprises cells 8 through 11, tend to remain lower than the cell voltages of peripheral cells 1 through 6 and 13 through 18.

FIG. 3A also shows that temperatures of the cells of the middle-cell group are significantly higher than the temperatures of the peripheral cells after EQ. These temperature differentials for center cells of a typical eighty-volt industrial battery pack during fast charging are illustrated in FIG. 4. As can be seen, there is up to a thirty-degree temperature gradient between cells in the center of the battery pack and cells that form the periphery of the battery pack.

As the foregoing demonstrates, without adequate cooling a battery pack is beset with reduced capacity and run time. Cell-to-cell imbalances can also lead to over-discharging during use and overcharging during recharging, both of which further affect the performance and lifespan of the battery pack. Therefore, there is a need for methods and apparatus for providing adequate cooling to battery packs, particularly, but not limited to, those used in industrial applications.

The operational efficiencies gained by fast charging introduce additional problems beyond that of just thermal and ventilation management. For example, the motor drive systems of most electric vehicles are not designed to withstand the high voltages employed by fast charging techniques. Accordingly, there is also a need for methods and apparatus to prevent these high voltages from being coupled to the motor drive system of an electric vehicle while the battery pack is being fast charged.

There are also safety and damage concerns relating to connecting a charger to the charging connections of a battery pack. Typically, a battery pack is located under a hood of the electric vehicle, and has charging connections that are not easily accessible by an operator. These undesirable characteristics expose the operator to the possibility of coming into contact with battery acid and/or increasing the risk of electrical shock when the operator is connecting charger connectors to the battery pack. Further damage and injury can result when the operator inadvertently fails to disconnect the battery charge connector from the charging connections of the electric vehicle, but then drives the vehicle away from the charger. Accordingly there are also needs for improved access and safety measures for use in charging battery packs of an electric vehicle. These needs would preferably be met by not having to make any modifications to the electric vehicle.

Finally, satisfactory solutions to integrating fast charging technology into electric vehicles are not available in the prior art. Rather, prior art solutions are ad hoc and require that modifications be made to the vehicle. For example, holes must be drilled and tapped to mount fans for cooling and to configure, route and mount fast charge connectors to the vehicle. Holes must also be cut into the battery compartment to allow the fast charging battery cables to pass through to the outside. In addition to the expense and tedium required to make such modifications, modifications themselves are undesirable since they can potentially void the vehicle's warranty and/or UL listing. Modifications also result in a reduction in the resale value of the vehicle, or a possible financial penalty being assessed against the lessee of a leased vehicle. Further, the ad hoc nature of prior art approaches results in a lack of uniformity, failing to provide a unique, integrated solution that can be consistently and successfully performed to accommodate fast charging technology without the need for operator intervention. Accordingly, there is a need for methods and apparatus for accommodating fast charging technology that do not require having to make modifications to the vehicle.

SUMMARY OF THE INVENTION

Methods of and apparatus for removing heat generated by cells of a battery pack are disclosed. The methods and apparatus may employ one or more fan modules disposed between or next to cells of the battery pack, or one or more fans directly mounted to the battery pack or battery pack case housing the cells. The fan modules or direct-mounted fans may be controlled by, for example, a thermostat, a battery mounted monitor and controller associated with the battery pack, a key switch, or a charger interlock. Methods of manufacturing the integrated battery pack and thermal and ventilation system are also described.

According to another aspect of the invention, a motor controller isolation system for an electric vehicle is disclosed. The motor controller isolation system operates to electrically isolate the motor controller of the electric vehicle when the battery pack is being charged. The motor controller isolation system can therefore be used to prevent high voltages from a fast charger from being coupled to the motor drive system of an electric vehicle when the battery pack is being fast charged. The motor controller isolation system, or portions thereof, may be included as part of one or more battery pack connectors that connect to connectors of a charger during charging. When the connectors are mated, the isolation system, which may include a mechanical or electrical control element, isolates the motor controller of the electric vehicle from both the battery pack and the battery charger. Hence, when the connectors are mated the vehicle cannot be driven, and injury to the operator or others and/or damage caused by driving the vehicle while still connected to the charger are avoided.

Although not required, the motor controller isolation system may be integrated with the integrated battery pack and thermal and ventilation system. In either or both embodiments, the integrated system is preferably, although not necessarily, manufactured in a manner that requires no, or substantially no, modifications to the electric vehicle in which the integrated system is installed.

According to an embodiment of the invention, the thermal management and ventilation and motor controller isolation systems may be housed in a single integrated battery unit (IBU), which can be easily installed in existing electric vehicles, without requiring any substantial modifications to be made to the vehicle. A charge port that is easily accessible by an operator, and/or a watering solenoid valve may also be integrated in the IBU. The charge port avoids having to access the battery pack from under a hood, and the watering solenoid valve permits an on-board watering supply to maintain watering levels in the various cells of the battery pack at appropriate levels. Finally, a battery mounted monitor and controller status indicator and/or a motor controller connected/disconnected status indicator (e.g. LEDs) may be integrated in the IBU.

According to an aspect of the invention, electric vehicles not having fast charging capabilities may be equipped with an integrated battery unit (IBU) having all the necessary components necessary to allow fast charging of the vehicle's battery pack. According to this aspect of the invention, the IBU is designed so that no modifications need be made to the electric vehicle. Among other features, a battery connection, electric vehicle power connection, thermal management and ventilation subsystem may be incorporated or integrated into the IBU.

Other aspects of the inventions are described and claimed below, and a further understanding of the nature and advantages of the inventions may be realized by reference to the remaining portions of the specification and the attached drawings. The same reference indicators will be used throughout the drawings to refer to the same or similar parts.

BRIEF DESCRIPTION OF THE DRAWINGS

FIGS. 5A-5D are side, front, top and isometric views, respectively, of a fan module for use in a battery pack, according to an embodiment of the present invention;

FIGS. 15A-15E illustrate an exemplary mechanical disconnect system that is operable to electrically isolate a motor controller of an electric vehicle from a battery pack and fast charger during fast charging, according to an embodiment of the present invention;

DETAILED DESCRIPTION

Figure 1:
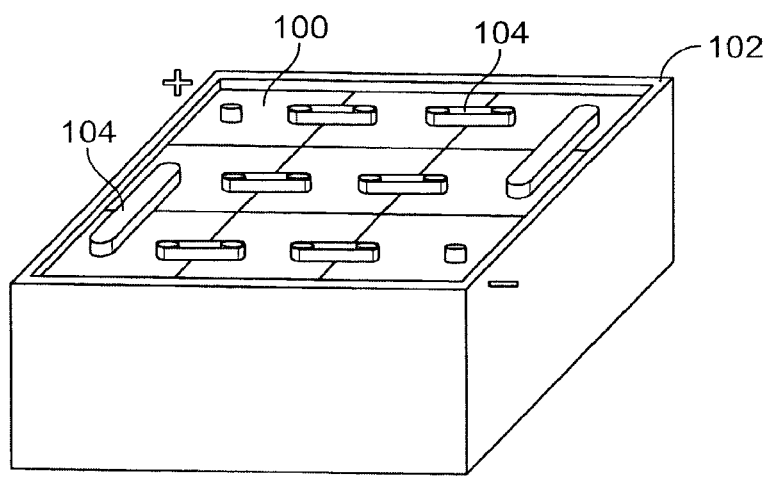
FIG. 1 is an isometric view of a prior art battery pack comprising a plurality of series-connected cells housed in a battery pack case.
Figure 2:
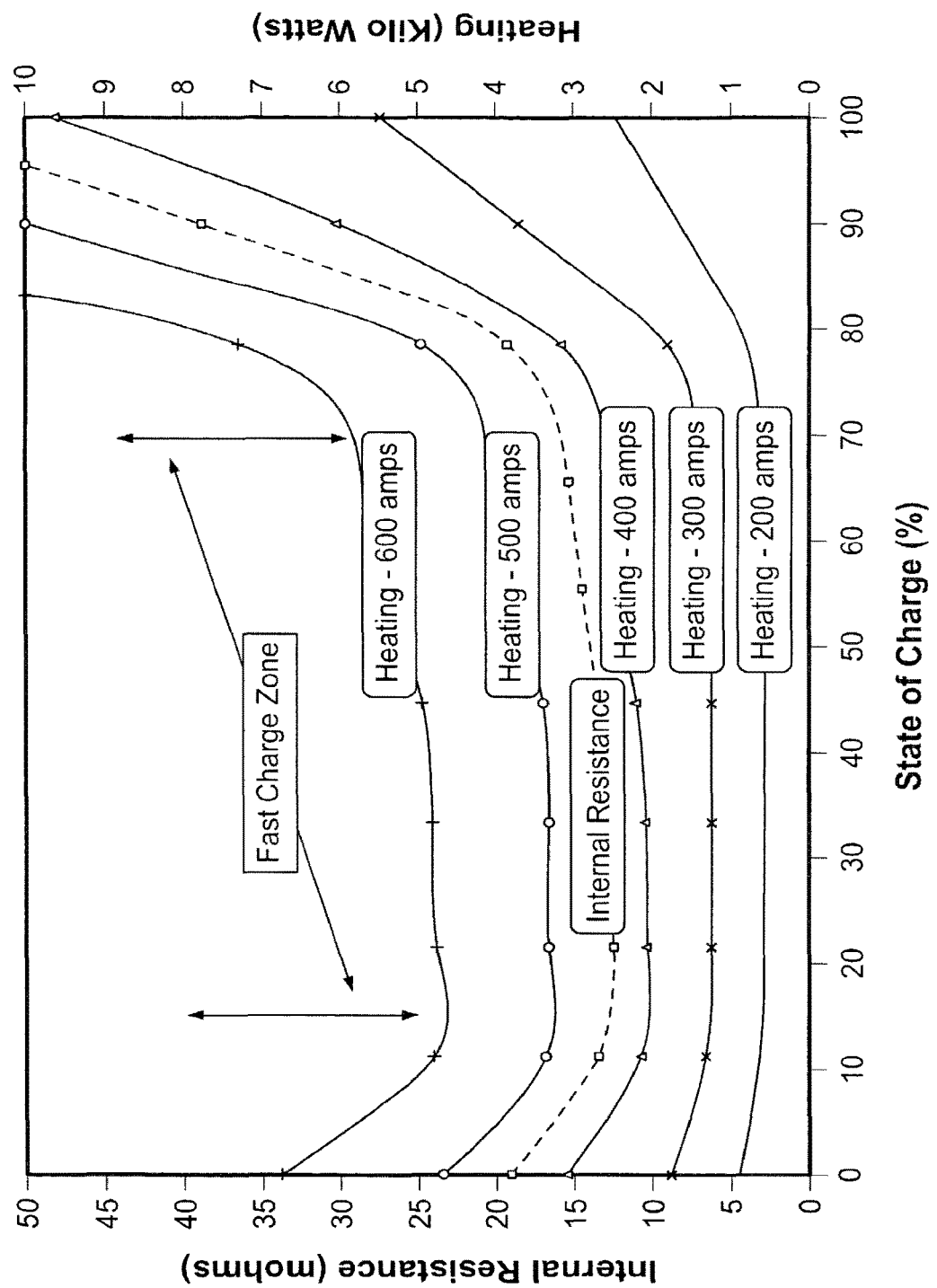
FIG. 2 is a graph showing the internal resistance (left vertical axis) and heat generation (right vertical axis) of a typical flooded industrial battery pack at different inrush currents and states of charge (SOC) of the battery pack.
Figures 3A, 3B:
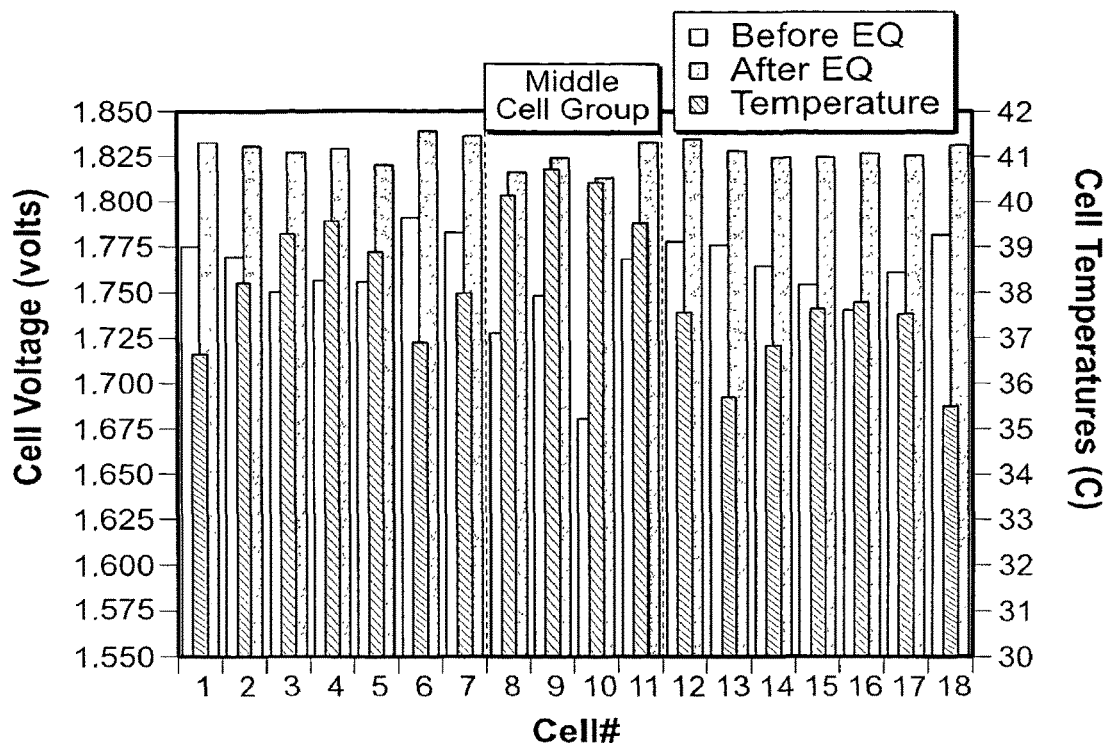
FIG. 3A is a graph showing cell voltages of a plurality of cells of a battery pack before and after an equalization process (EQ), and the cell temperatures of each of the plurality of cells at the end of the EQ.
FIG. 3B is a map of the locations of the plurality of cells for the data represented in the graph of FIG. 3A.
Figure 4:
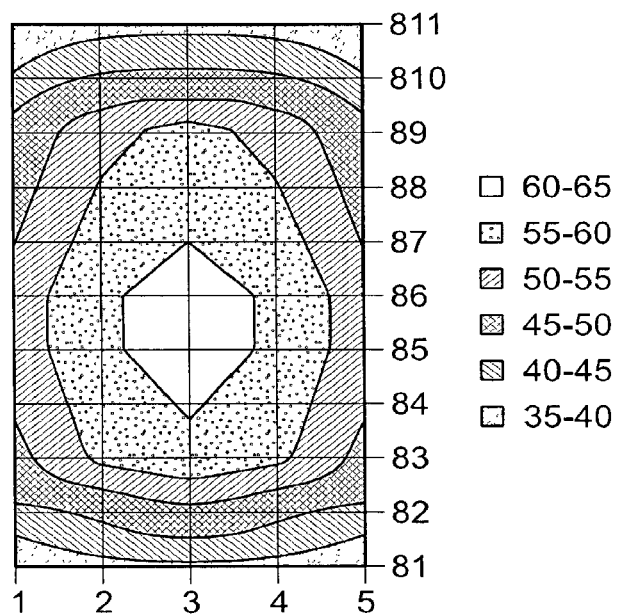
FIG. 4 is a temperature gradient graph of a plurality of cells of a typical industrial battery pack during fast charging.

According to a first embodiment of the present invention, a thermal and ventilation management system for a battery pack is disclosed. The system includes one or more "fan-modules" that are inserted between cells of a battery pack, which may be housed in a battery pack case (i.e., "tray"). The battery pack may be a custom-made battery pack or may be a standard battery pack, as shown, for example, in FIG. 1.

FIGS. 5A-5D are side, front, top and isometric views, respectively, of a fan module 500 for use in a battery pack, according to an embodiment of the present invention. An air inlet port 502 is configured to receive fresh air from the environment. A first filter 504 (e.g. a mesh screen) prevents dirt and other particulate matter from entering the fan module 500 through the air inlet port 502. An air outlet port 506 is configured to eject heated air out into the environment and away from the battery pack and battery pack case. As shown in FIGS. 5C and 5D, a second filter (e.g. a mesh screen) 508 is included at the air outlet port 506, to prevent dirt and other particulate matter from entering the interior of the fan module 500. The fan module 500 may also include an inlet port extension 510, which as explained and shown below, extends laterally over and outside the upper edge of the battery pack case. The inlet port extension 510 allows the drawing in of fresh air into the fan module 500.

The side panels of the fan module 500 are made of a conductive material, e.g. metal, so that when inserted between cells of the battery pack they are capable of conducting heat away from the battery pack cells. One or more slots or "cut-outs" 512 are made through the side panels. These cut-outs 512 allow air in the fan module 500 to come into intimate contact with the battery pack cell walls, thereby allowing heat generated by the cells to be transferred to the contacting air. As shown and explained in more detail below, the side panels of the fan module 500 are preferably pressed up firmly against the exterior walls of associated battery pack cells. In this manner, airflow is maintained within, and directed through, the fan module 500 in a predetermined manner, and heat transfer from the cells to the passing air is enhanced.

Figure 6A:
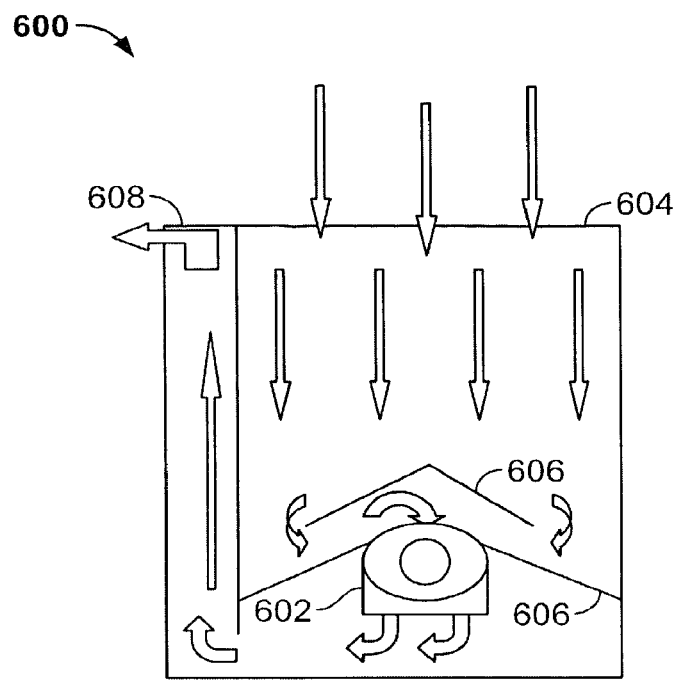
FIG. 6A is a side-interior view of a fan module, illustrating: an air inlet port, an airflow path, a fan, fan protectors, and an air outlet port of the fan module, according to an embodiment of the present invention.
Figure 6B:
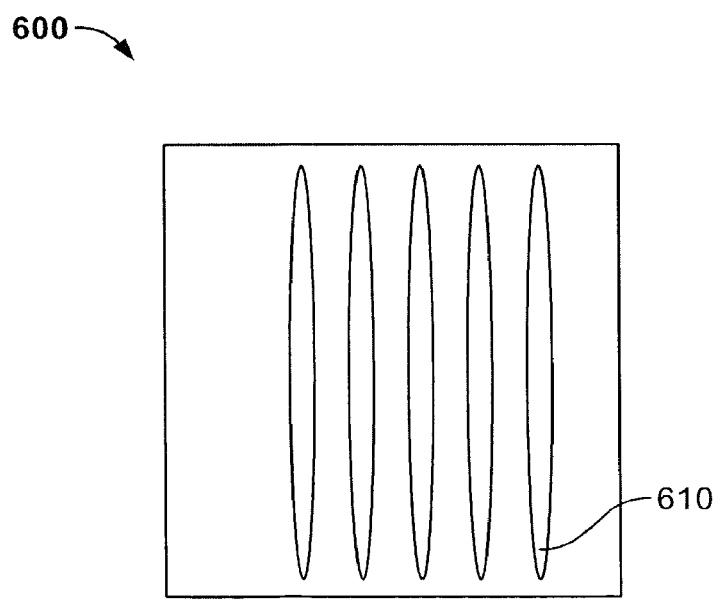
FIG. 6B is a side-exterior view of the fan module shown in FIG. 6A, which illustrates metal cut-outs through the fan module side panels, according to an embodiment of the present invention.

FIG. 6A is a side-interior view of a fan module 600 illustrating an exemplary airflow path into, through, and out the fan module 600. According to this fan module embodiment, the air inlet port 604 and the air outlet port 608 are reversed compared to the fan module embodiment shown in FIG. 5. A fan 602, which is affixed near the bottom interior of the fan module 600, operates to draw fresh air from the environment through an air inlet port 604 into the interior of the fan module 600. The drawn in air is circulated and directed through the fan module 600 by operation of the fan 602. One or more fan protectors 606 protect the fan 602 from being exposed to dirt and water, which might enter the air inlet port 604. Any dirt and water that may enter the fan module 600 is captured at the bottom of the fan module 600, where it can be subsequently removed by an access or drainage port (not shown) during maintenance and servicing. The angles of the fan protectors 606 also facilitate draining and remove the dirt and water from the main airflow path, thereby reducing the likelihood that the dirt and water will be ejected from the air outlet port 608 of the fan module 600. As explained and shown in more detail below, because the fan module 600 is interposed between battery pack cells, and the side panels of the fan module 600 are in direct contact with the exterior walls of associated cells, heat from the cells is transferred to the circulating air and then ejected out the air outlet port 608. As shown in FIG. 6B, one or more cut-outs 610 may be made through the side panels of the fan module 600 to facilitate heat transfer from the cells to the circulating air.

Figure 7:
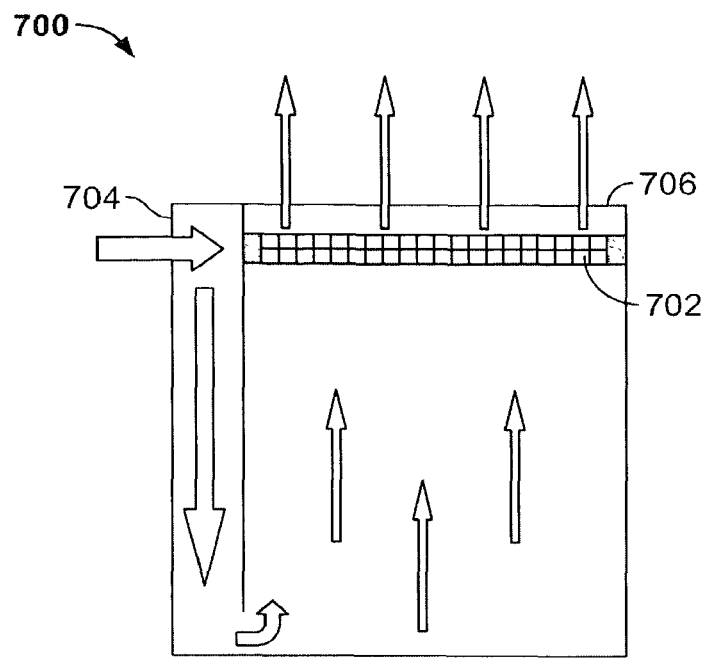
FIG. 7 is a side-interior view of a fan module, illustrating an air inlet port, an airflow path, a fan, and an air outlet port, according to an embodiment of the present invention.

FIG. 7 is a side-interior view of an alternative fan module 700. A squirrel cage type fan 702, or other fan, is affixed near the top interior of the fan module 700, and draws fresh air from the environment into an air inlet port 704. The height of the fan module 700 is dimensioned so that when inserted in the battery pack case, the air inlet port 704 is above the upper edge of the battery pack case. Although not shown in the drawing, the fan module 700 may also include an inlet port extension (similar to that shown in FIG. 5), which extends laterally over and outside the upper edge of the battery pack case. The drawn in air is circulated and directed through the fan module 700 by operation of the fan 702. Heat from the cells is transferred to the circulating air and then ejected out an air outlet port 706. Similar to other fan module embodiments, because the air is constrained within the fan module 700, it is forced to exit the air outlet port 706 at the top of the fan module 700. Also similar to other fan module embodiments, one or more cut-outs may also be made through the side panels of the fan module 700 to facilitate heat transfer from the cells to the circulating air.

Figure 8:
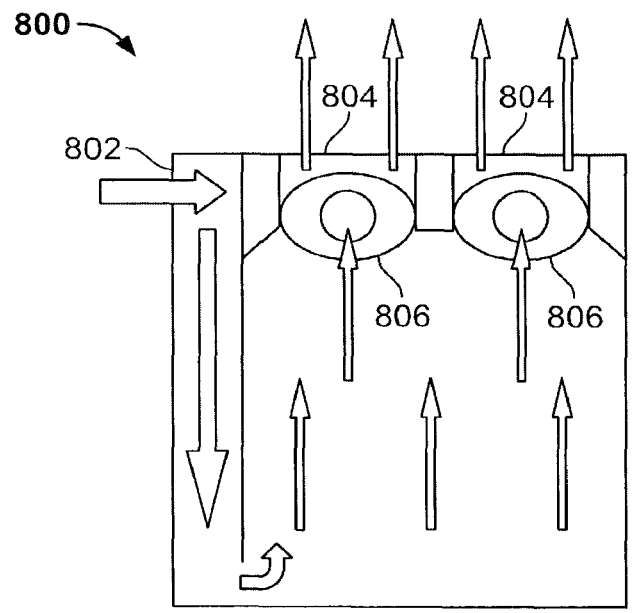
FIG. 8 is a side-interior view of a fan module, illustrating an air inlet port, an airflow path, fans, and an air outlet port, according to an embodiment of the present invention.

FIG. 8 is a side-interior view of an alternative fan module 800, according to an embodiment of the present invention. The fan module 800 is similar to the fan module 700 shown in FIG. 7. It has an air inlet port 802, an air outlet port 804, and two or more fans 806 affixed near the top interior of the fan module 800. The principles of operation are similar to that described in connection with the fan module 700 described above.

Figure 9:
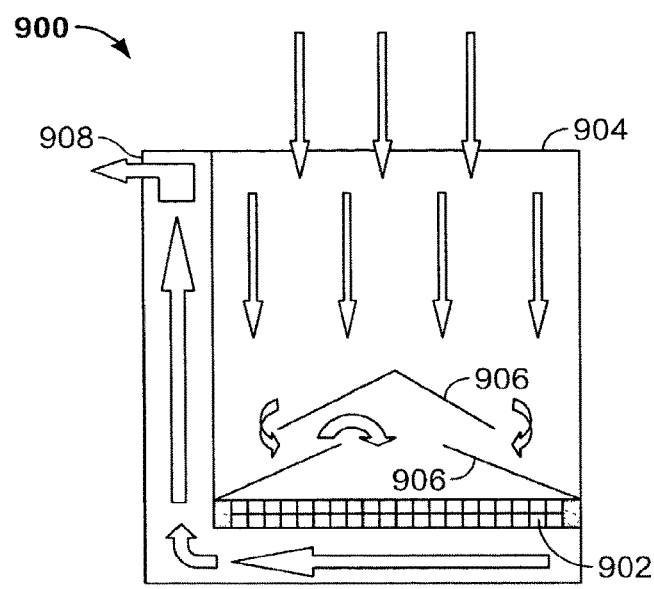
FIG. 9 is a side-interior view of a fan module, illustrating an air inlet port, an airflow path, a fan, fan protectors, and an air outlet port of the fan module, according to an embodiment of the present invention.

FIG. 9 is a side-interior view of an alternative fan module 900, according to another embodiment of the present invention. The fan module 900 is similar to the fan module 600 shown in FIG. 6, except that it employs a squirrel cage type fan 902. The fan 902, which is affixed near the bottom interior of the fan module 900, operates to draw fresh air from the environment through an air inlet port 904 into the interior of the fan module 900. The drawn in air is circulated and directed through the fan module 900 by operation of the fan 902. One or more fan protectors 906 protect the fan 902 from being exposed to dirt and water, which might enter the air inlet port. Any dirt and water that may enter the fan module 900 is captured at the bottom of the fan module 900, where it can be subsequently removed by an access or drainage port (not shown) during maintenance and servicing. The angles of the fan protectors 906 also facilitate draining and remove the dirt and water from the main airflow path, thereby reducing the likelihood that the dirt and water will be ejected from the air outlet port 908 of the fan module 900. As explained and shown in more detail below, because the fan module 900 is interposed between battery pack cells, and the side panels of the fan module 900 are in direct contact with the exterior walls of associated cells, heat from the cells is transferred to the circulating air and then ejected out the air outlet port 908. Similar to the other fan embodiments, one or more cut-outs may be made through the side panels of the fan module 900 to facilitate heat transfer from the cells to the circulating air.

Figure 10A:
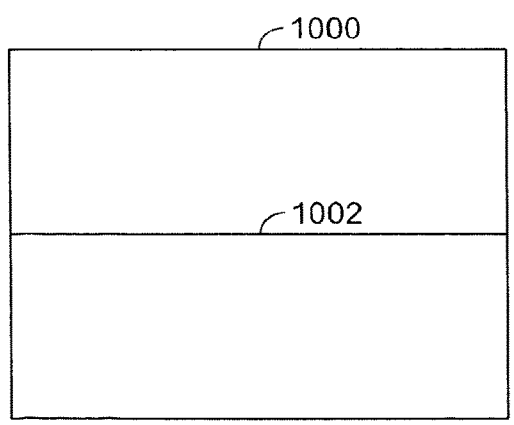
FIGS. 10A-10J are a sequence of drawings, illustrating the manner by which the battery pack/fan module embodiment of the invention is assembled.
Figure 10B:
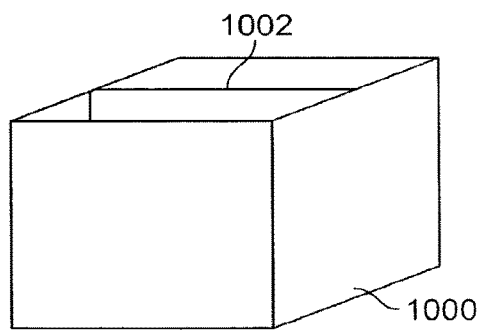

Referring now to FIGS. 10A-10J, there is shown a sequence of drawings, illustrating the manner by which the battery pack/fan module concept of the invention is assembled. FIGS. 10A and 10B show top and isometric views of an empty battery pack case (or "tray") 1000 within which battery pack cells and fan modules of the types similar to that shown and described above in FIGS. 5-9 are inserted. Although not required the battery pack case 1000 includes one or more partitions 1002, which add stability to the case 1000.

Figure 10C:
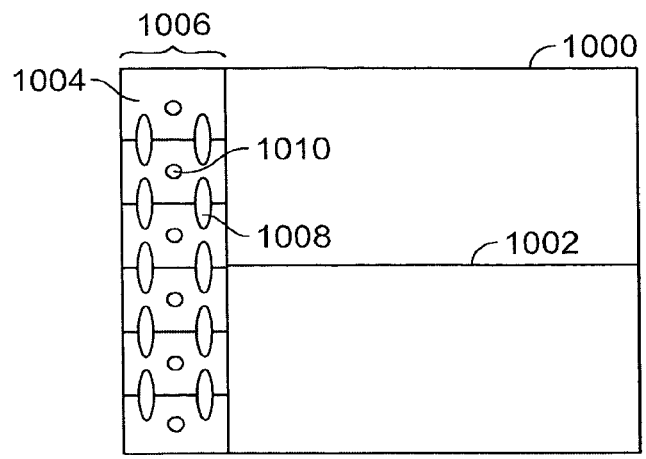
Figure 10D:
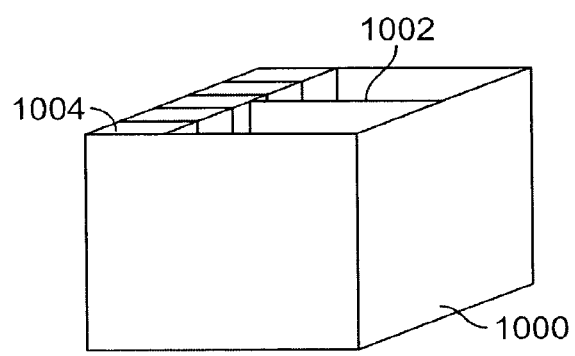

FIGS. 10C and 10D are top and isometric views of the battery pack/fan module assembly after six cells 1004 have been inserted into the battery pack case 1000. According to one embodiment, a person performing the assembly first inserts cells 1004 in a first row 1006. Because the cells 1004 are heavy (can be on the order of 200 lbs. each), a hoist or other lifting device may be used to assist in the assembly. Lead or other conducting bars 1008 are then connected between the cells 1004 in the row 1006 so that the cells 1004 are electrically connected in series. Each of the cells 1004 may also have one or more vents 1010, which allow gases formed within the cells 1004 to escape from the cells.

Figure 10E:
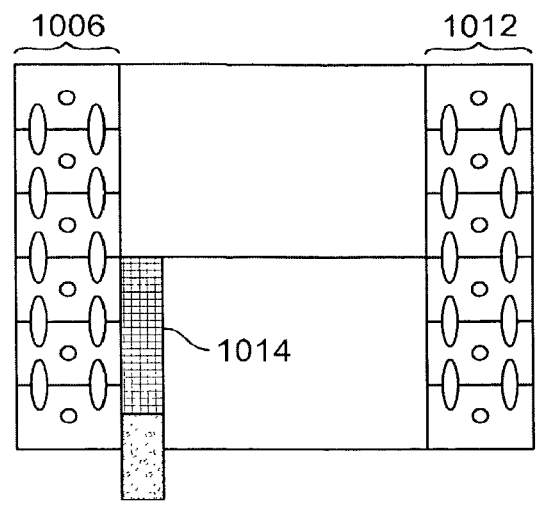
Figure 10F:
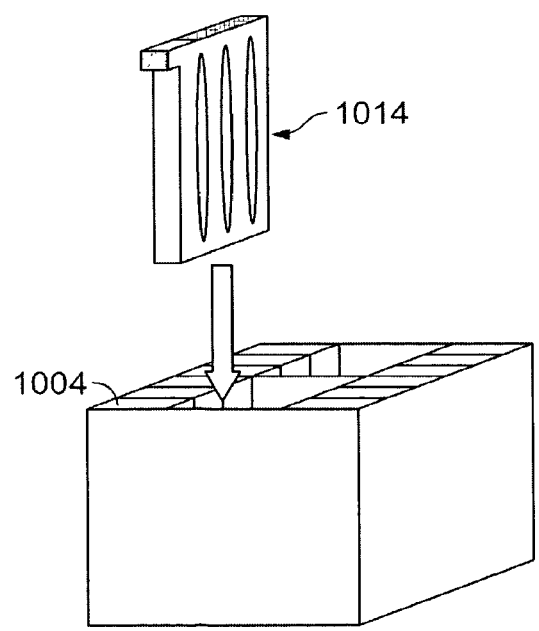

FIG. 10E is a top view of the battery pack/fan module assembly after a second row 1012 of six cells has been inserted into the battery pack case 1000. This drawing and FIG. 10F also illustrate the insertion of a first fan module 1014 in the battery pack case 1000 next to three of the cells 1004 of the first row 1006 of cells.

Figure 10G:
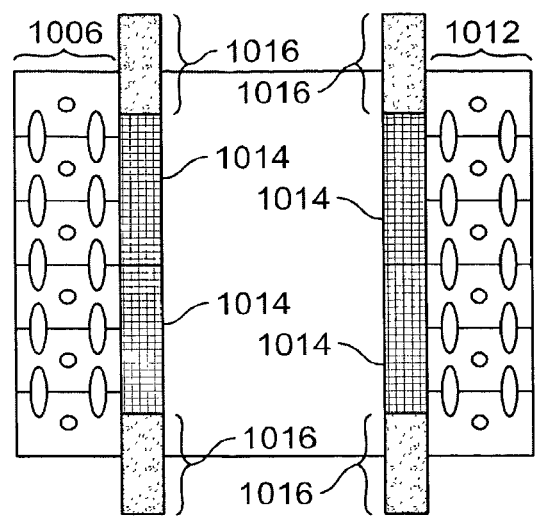

FIG. 10G is a top view of the battery pack/fan module assembly after the first 1006 and second 1012 rows of cells, and four fan modules 1014 have been installed in the battery pack case 1000. As shown, the fan modules 1014 each have air port extensions 1016, which extend laterally over and outside the upper edge of the battery pack case 1000. As described above, these air port extensions 1016 may embody either an inlet port extension or an outlet port extension, depending on which of the various fan modules described above in FIGS. 5-9 is adopted for use.

Figure 10H:
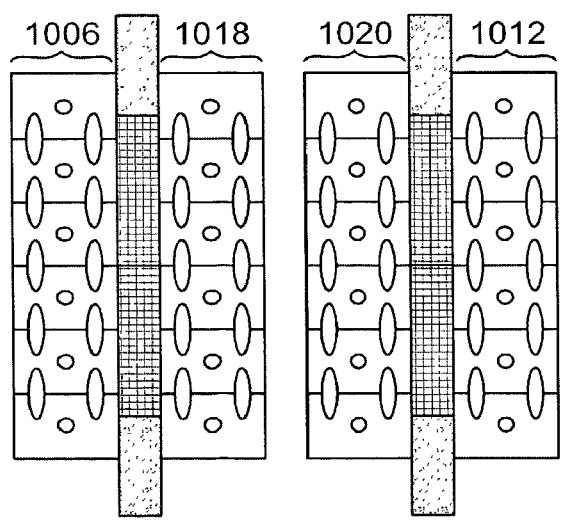
Figure 10I:
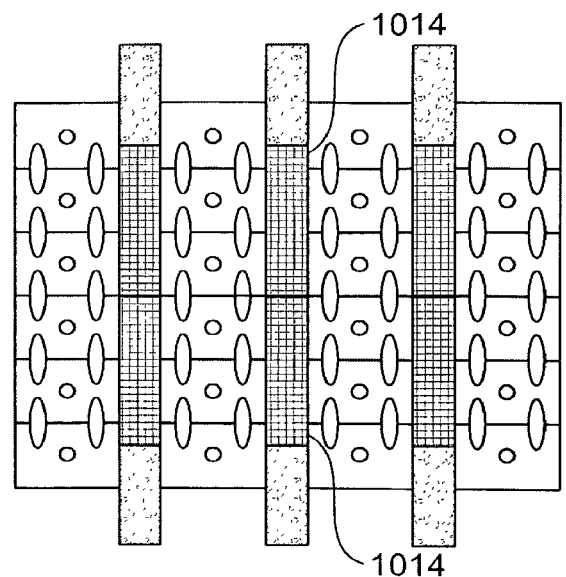

FIG. 10H is a top view of the battery pack/fan module assembly after third 1018 and fourth 1020 rows of cells have been installed in the battery pack case 1000. FIG. 10I is a top view after the final two fan modules 1014 have been installed in the battery pack case 1000.

Figure 10J:
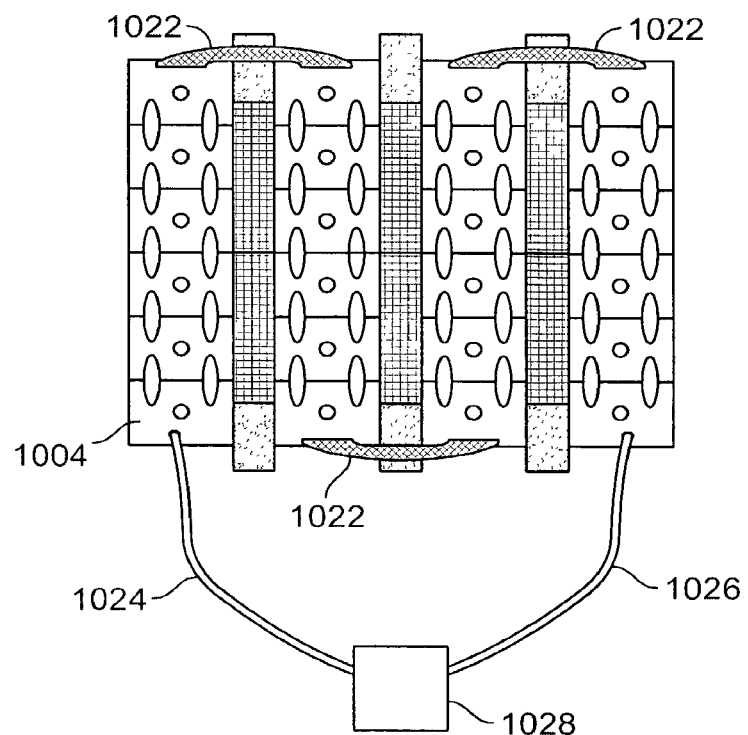

FIG. 10J is a top view of the battery pack/fan module assembly after final assembly. End row connectors 1022 have been connected to end row cells so that all cells 1004 of the battery pack are connected in series. Positive and negative cables 1024 and 1026 have been connected and joined in a connector 1028. In an exemplary configuration, each cell 1004 provides a voltage of two volts, so that when all twenty-four cells are connected in series the battery pack provides a standard forty-eight volts.

Figure 11:
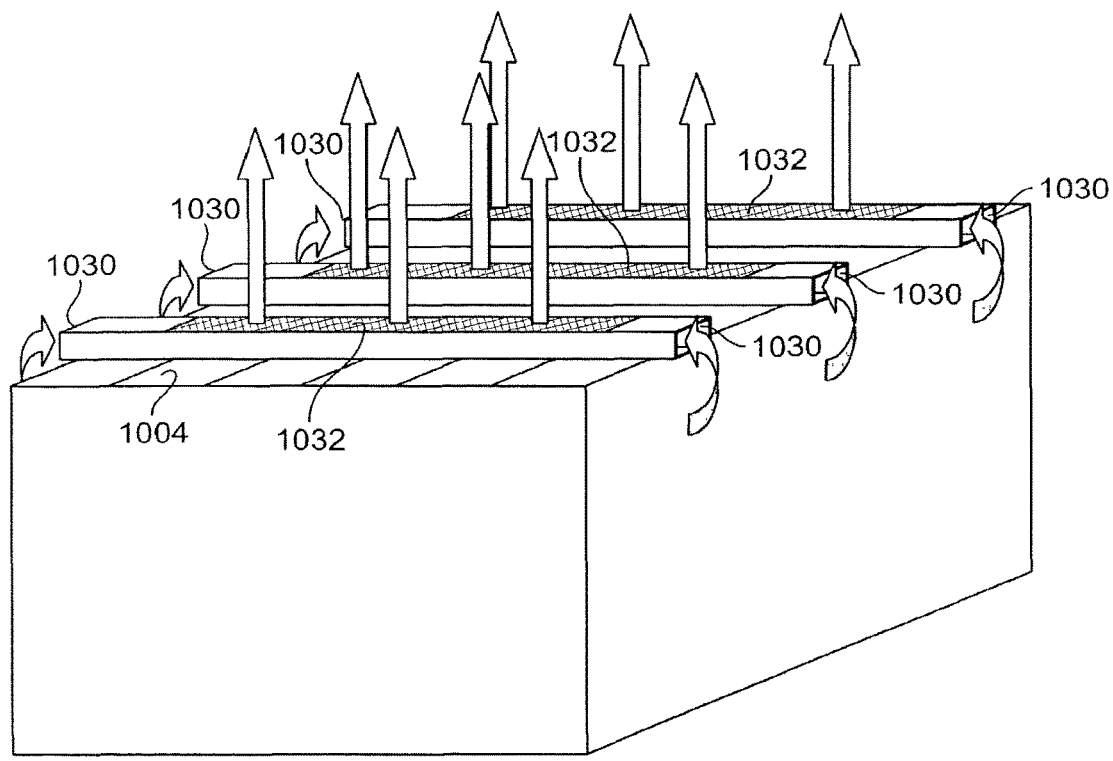
FIG. 11 is an isometric view of a completed battery pack/fan module assembly, illustrating exemplary airflow paths, according to an embodiment of the present invention.

FIG. 11 is an isometric view of a completed battery pack/fan module assembly, illustrating exemplary airflow paths, according to an embodiment of the present invention. The fan modules 1014 have inlet ports 1030 with extensions that extend laterally over and outside the upper edge of the battery pack case 1000. This configuration allows the air inlet ports 1030 to access fresh air outside the confines of the battery pack case 1000. As explained previously, one or more fans within each fan module 1014 draw the fresh air into the air inlet ports 1030, and circulates the air through the fan module 1014 so that heat from the battery pack cells 1004 is transferred to the air and finally directed out air outlet ports 1032 of the fan modules 1014.

As explained above, the side panels of the fan modules 1014 are made of a conductive material, e.g. metal, so that when inserted between cells of the battery pack they are capable of conducting heat away from the battery pack cells. The side panels of the fan modules 1014 are preferably pressed up firmly against the exterior walls of associated battery pack cells. In this manner, airflow is maintained within, and directed through, the fan modules 1014 in a predetermined manner. Preferably, one or more slots or "cut-outs" are made through the side panels of each of the fan modules 1014. The cutouts allow air in the fan modules 1014 to come into intimate contact with those the exterior walls of the cells in which the side panels are in contact. This configuration allows heat generated by the cells to be more readily transferred to the contacting air.

A significant benefit of the battery pack/fan module assembly shown and described above, in addition to its temperature and ventilation management capabilities, is that it can be installed in electric vehicles without requiring any modification to the vehicle itself.

The fan modules 1014 of the battery pack/fan module assembly can be configured to operate continuously, e.g., during charging as well as while the vehicle is being driven. Alternatively, the fan modules 1014 can be configured so that they are operational during certain times, for example: only during charging; during charging but also at predetermined times before or after charging; or only while the vehicle is being driven. The ON/OFF status of the fan modules may be controlled by, for example, a thermostat, a key switch, a charger interlock, or a battery mounted monitor and controller associated with the battery pack. The battery mounted monitor and controller may be in the form of a module, which can be attached to or associated with one or more cells of the battery pack. Among other capabilities, the battery mounted monitor and controller may contain temperature sensing and data collection components. The sensed temperature and/or temperature-related collected data can be used to control the ON/OFF status of one or more of the fan modules 1014.

In an embodiment alternative to that shown in FIG. 11, the fans of the fan modules 1014 can be run in reverse, so that fresh air is drawn in from the tops of the fan modules 1014, and air heated by the cells 1004 is ejected out the side ports of the fan modules 1014. In this alternative embodiment, the air inlet and output ports are reversed from that initially described and shown in FIG. 11.

Figure 12A:
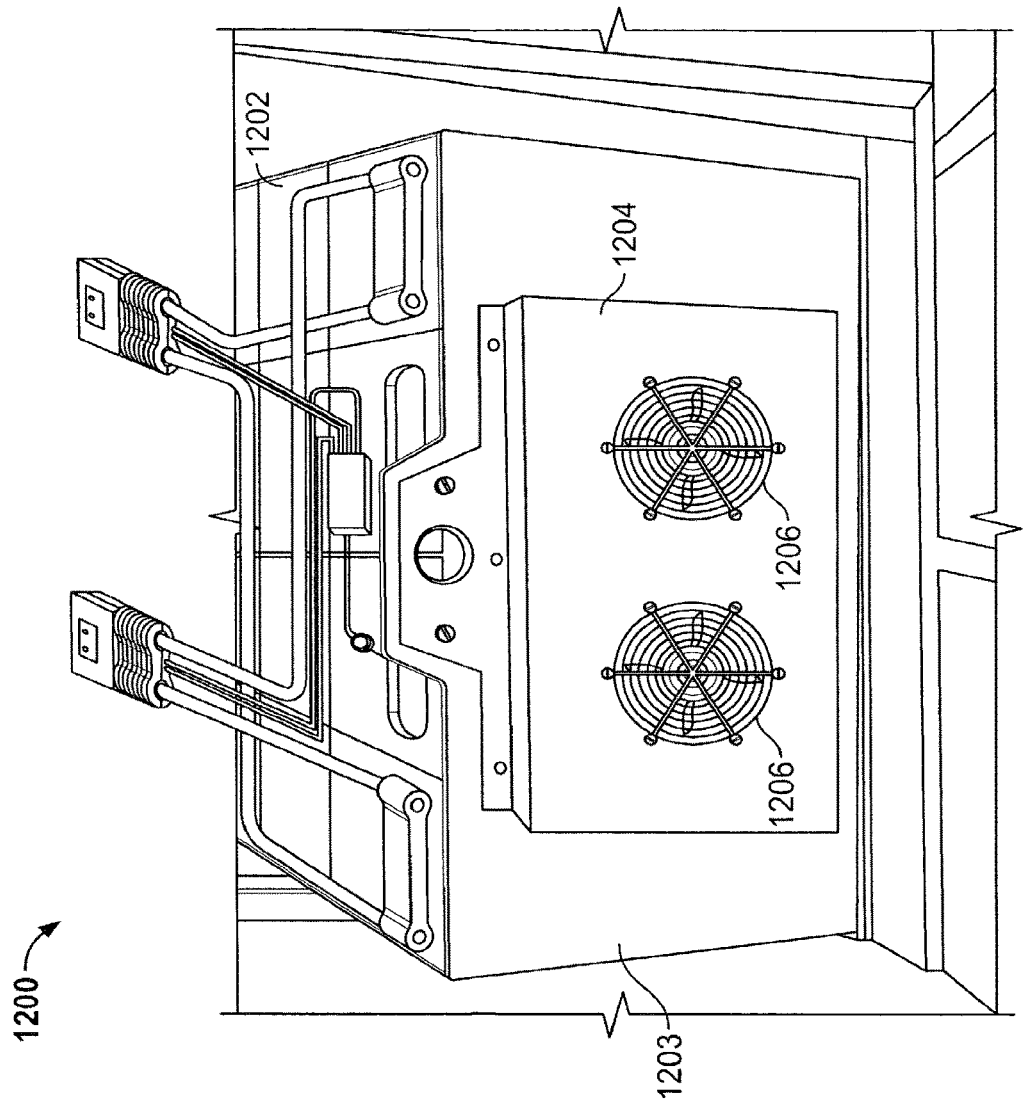
FIGS. 12A and 12B show front and isometric views of an alternative battery pack temperature and ventilation management system, according to an embodiment of the present invention.
Figure 12B:
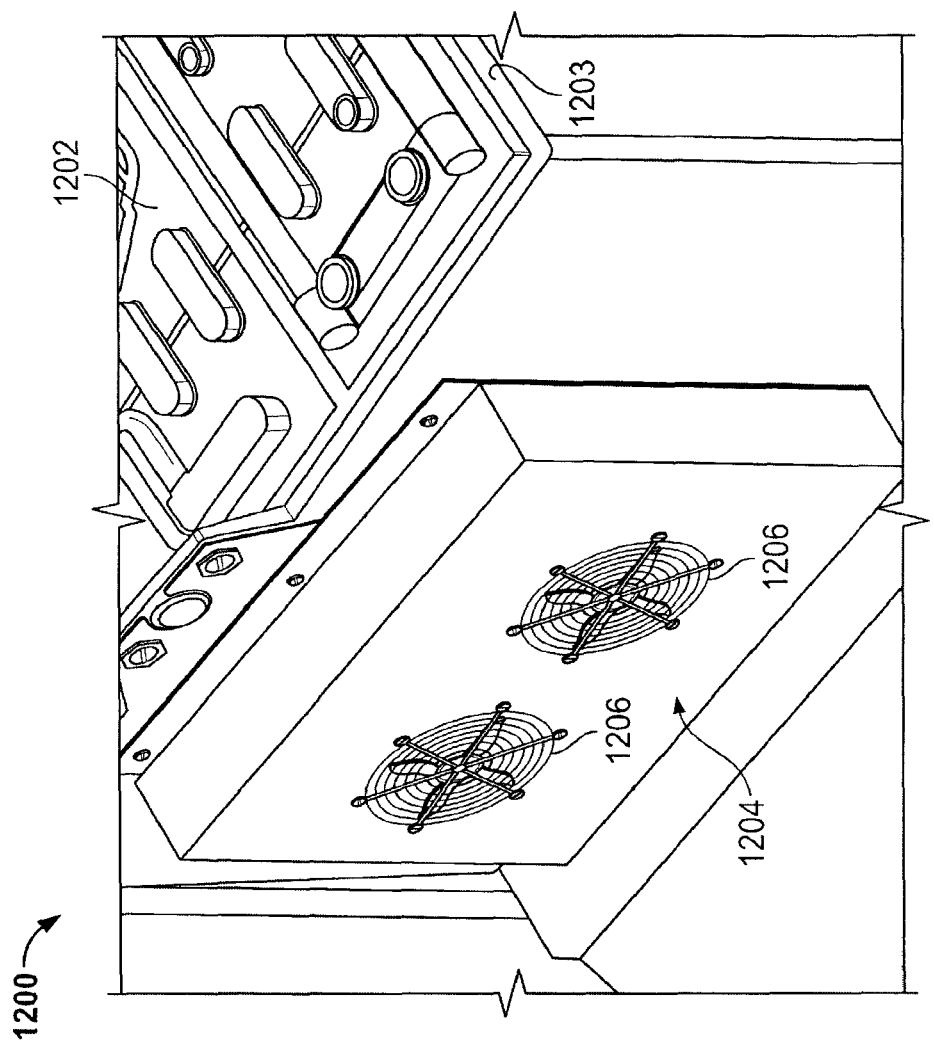

Turning now to FIGS. 12A and 12B, there are shown front and isometric views of an alternative battery pack temperature and ventilation management system 1200, according to an embodiment of the present invention. The battery pack temperature and ventilation management system 1200 comprises a battery pack 1202, battery pack case 1203, and a direct-mounted cooling fan box 1204 containing one or more fans 1206. Rather than interpose fan modules between cells of the battery pack as described in the alternative embodiment above, the fan box 1204 is mounted directly to the battery pack case 1203. This provides cooling to the battery pack case 1203 and the battery pack 1202. The battery pack case may have cutouts (not shown) so that the forced air from the fan box 1206 can directly flow onto and through the cells of the battery pack 1202, thereby providing enhanced cooling.

Figure 13:
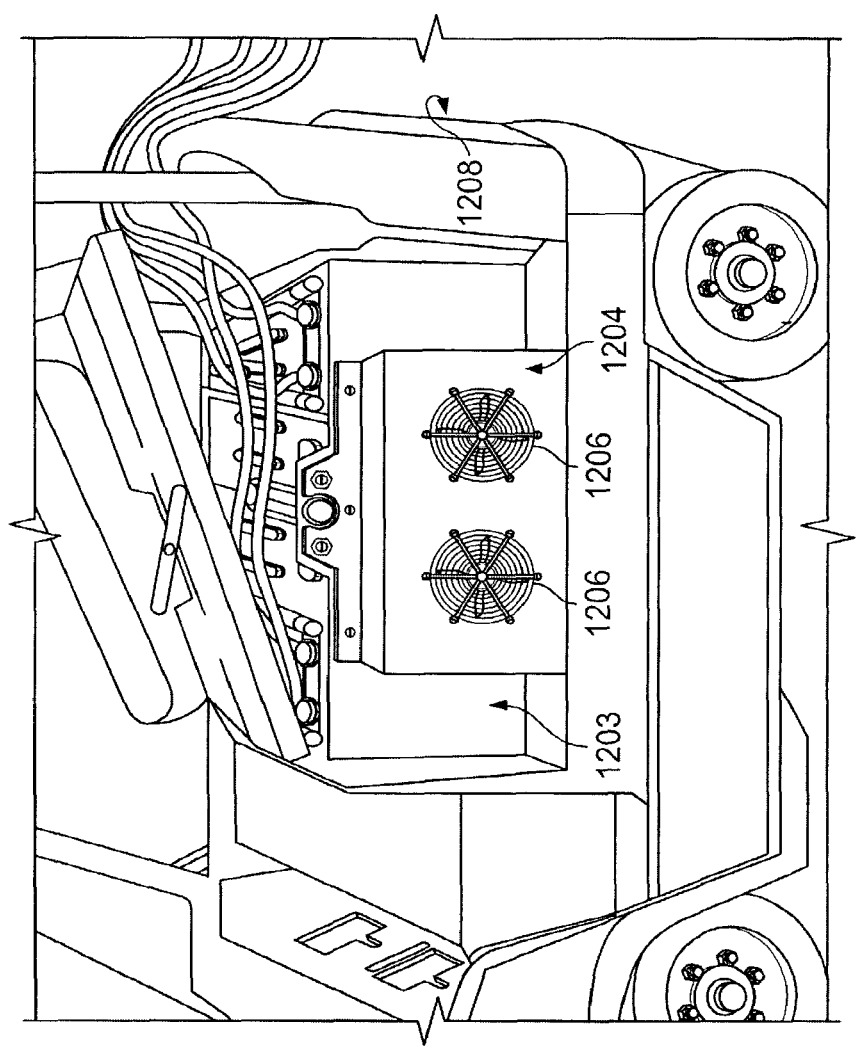
FIG. 13 is an illustration of a battery pack having a direct mounted cooling fan box installed in an electric vehicle, according to an embodiment of the present invention.

FIG. 13 is an illustration of a battery pack having a direct-mounted cooling fan box 1204, which includes one or more fans 1206, installed in an electric vehicle 1208, according to an embodiment of the present invention. Mounting the fan box 1204 directly to the battery pack case 1203 allows the battery pack temperature and ventilation management system 1200 to be installed in the electric vehicle without having to undergo any modifications to the vehicle.

To further the desire of not having to make any modifications to an electric vehicle in order to accommodate fast charging, it may be necessary to provide a mechanism for isolating the vehicle motor controller from the battery pack during fast recharging. The reason for this possible requirement is due to the fact that the motor controllers of many electric vehicles are not designed to withstand the high voltages used in fast charging. Isolation of the motor controller could be performed by requiring an operator to unplug connectors installed between the motor controller and the battery pack. However, this approach has the drawback that an operator may simply forget to unplug the connectors before configuring the battery pack for fast recharging. Further, the connectors between the motor controller and the battery pack are not always easily accessible by an operator. This poses the risk that the operator might come into contact with battery acid and/or suffer electrical shock.

Figure 14A:
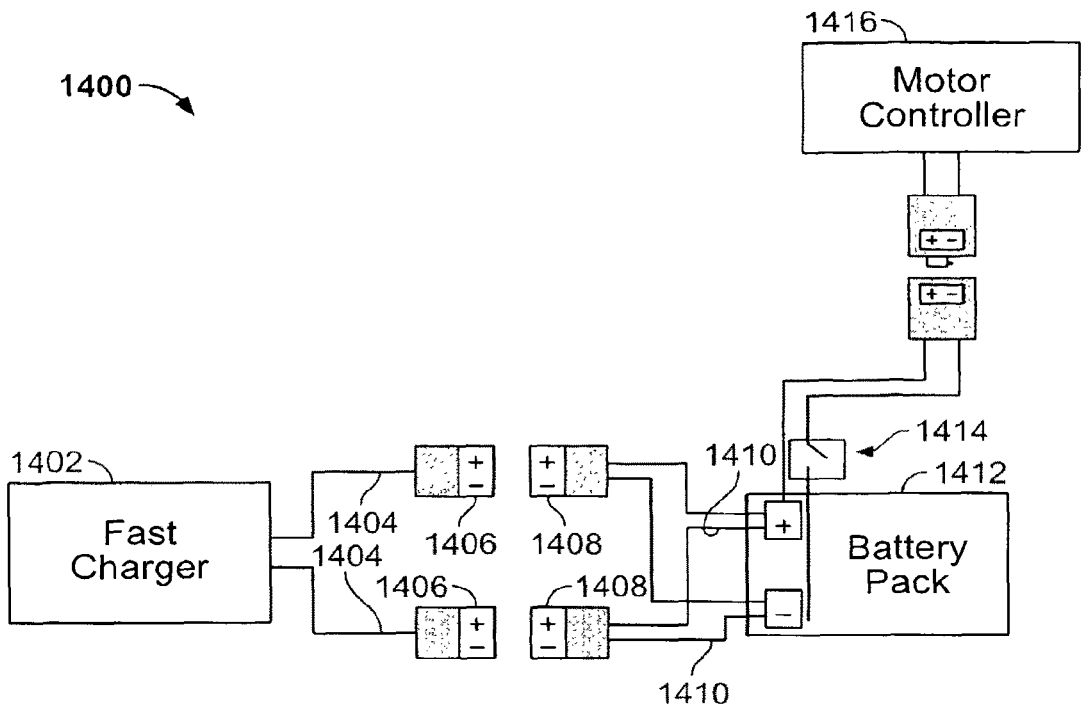
FIG. 14A shows an electric vehicle motor controller isolator that can be used to guarantee motor controller isolation during fast recharging by a fast charger, according to an embodiment of the present invention.

FIG. 14A shows the concept of an electric vehicle motor controller isolator 1400 that can be used to avoid these risks and guarantee motor controller isolation during fast recharging by a fast charger 1402, according to an embodiment of the present invention. Cables 1404 and connectors 1406 of the fast charger 1402 are connected in a parallel, and are configured to mate with dual cables 1408 and connectors 1410 of the battery pack 1412. The dual cables 1408 and connectors 1410 of the battery pack 1412 are used to support the high currents drawn by the battery pack 1412 during fast charging. An electrical contactor (e.g. a micro switch, key switch or other switch) or mechanical disconnect 1414, an exemplary embodiment which is described below, is operable to electrically isolate the electric vehicle motor controller 1416 when the charger connectors 1406 are plugged into the battery pack connectors 1410. This aspect of the invention is also beneficial in that it does not allow the vehicle to be driven away from the charger 1402 when the charger connectors 1406 and battery pack connectors 1410 are still mated. The operator must first unplug the connectors 1406, 1410 before the vehicle can be driven away from the charger 1402.

Figure 14B:
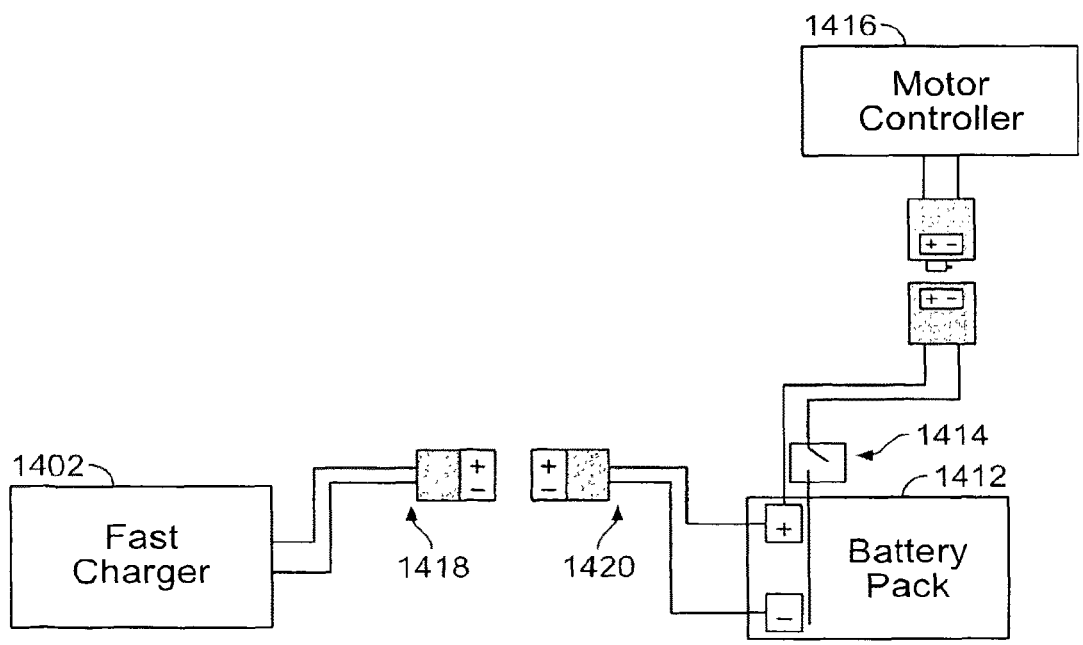
FIG. 14B is an illustration of an electric vehicle motor controller isolator for a charging system, according to an alternative embodiment of the present invention.

FIG. 14B is an illustration of an electric vehicle motor controller isolator for a charging system, according to an alternative embodiment of the present invention. This embodiment is similar to the embodiment shown in FIG. 14A, except that a single set of connectors and cables 1418, 1420 are used, rather than parallel-connected connectors and cables. These cables and connectors have current ratings sufficient to withstand the high currents flowing through them during fast charging.

FIGS. 15A-15E show components of an exemplary mechanical disconnect system that is operable to electrically isolate a motor controller of an electric vehicle from a battery pack and fast charger during fast charging, according to an embodiment of the present invention.

FIG. 15A is a drawing of an exemplary charging connector 1500, which comprises a base 1502 and first and second electrically conducting (e.g. metal) pins 1504—one positive and one negative. End portions 1506 of the first and second pins 1504 are covered by an electrically insulating material such as plastic or Teflon. Cables 1505 electrically couple the charging connector to a charger. The charging connector 1500 also contains electrical signal pins (not shown), which explained in more detail below are for making electrical contact to signal pin contacts on a charging and motor controller isolation assembly. A signal line 1507 comprising a plurality of signal wires that electrically couple the signal pin contacts to the charger.

FIG. 15B is an illustration of a charging receptacle 1508, which is adapted to receive the charging connector shown in FIG. 15A during fast charging. The charging receptacle 1508 has first and second female sleeves 1510 designed to receive the first and second pins 1504 of the charging connector 1500. The first and second female sleeves 1510 are mechanically supported and electrically isolated from one another by a non-conducting sleeve bridge 1512. The first and second females sleeves 1510 are made of an electrically conducting material (e.g. metal), and have end portions 1514, which similar to the end portions 1506 of the charging connector pins 1504, are covered by a plastic or other electrically insulating material such as, for example, Teflon. The non-conducting end portions 1514 of the sleeves 1510 help to ensure that the pins 1504 of the charging connector 1500 are not inadvertently shorted to the charging receptacle 1508 when the charging connector 1500 is being mated with the charging receptacle 1508. They also help to prevent exposing an operator to electrical shock when the charging connector 1500 is being mated with the charging receptacle 1508. The charging receptacle also includes first and second contact posts 1516, which are adapted for connecting to cables of a battery pack.

Figure 15C:
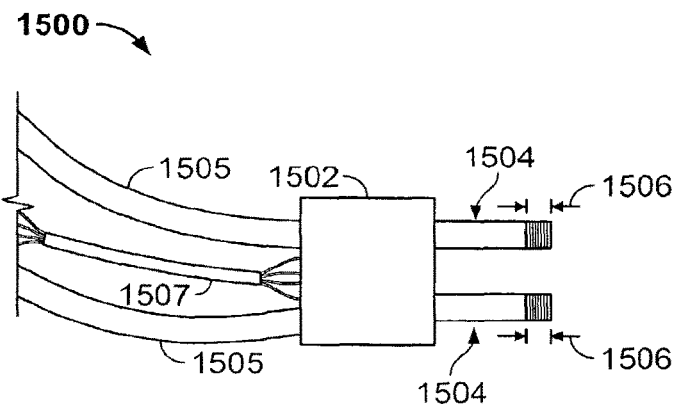
Figure 15C:
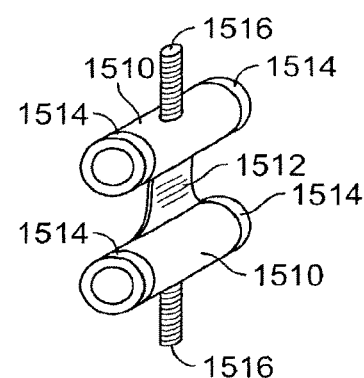
Figure 15C:
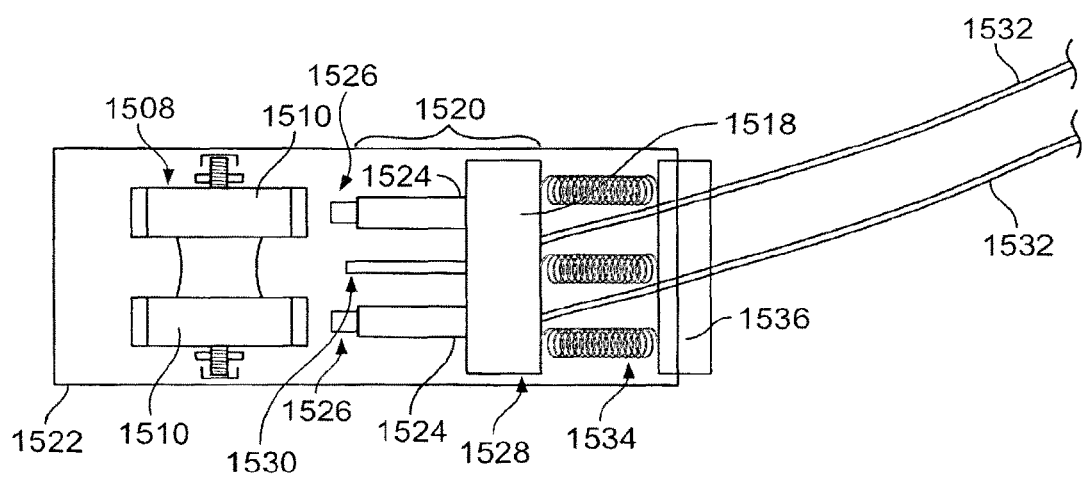

FIG. 15C is an illustration of a charging and motor controller isolation assembly that includes the charging receptacle 1508 of FIG. 15B and a spring controlled electric vehicle drive connector 1520. The charging receptacle 1508 is permanently mounted to a support substrate 1522. The vehicle drive connector 1520 comprises a base 1518 and first and second electrically conducting (e.g. metal) pins 1524, which like the charging connector pins 1504 have end portions 1526 that are covered by an electrically-insulating material such as plastic or Teflon. The vehicle drive connector 1520 is movably mounted on a slider 1528, which allows the vehicle drive connector pins 1524 to move into and out of the charging receptacle sleeves 1510. The slider 1528 is movably mounted on a track 1530, which is affixed to the support substrate 1522 and aligned so that the vehicle drive connector pins 1524 can be moved into and out of the charging receptacle sleeves 1510. The conducting portions of the vehicle drive connector pins 1524 are adapted for fitting with cables 1532, which connect to the motor controller of the electric vehicle. One or more springs 1534, or other actuating device(s), are installed between a fixed compression plate 1536 and a surface of the base 1518 of the vehicle drive connector 1520. The spring(s) 1534 is(are) operable to push the vehicle drive connector 1520 along the track 1530 so that the vehicle drive connector pins 1524 are inserted into the charging receptacle sleeves 1510 when the charging connector 1500 is not mated with the charging receptacle 1508. Alternatively, as shown in FIGS. 15D and 15E below, one or more springs 1538, or other actuating device(s), may be installed between the fixed charging receptacle 1508 and the movable vehicle drive connector 1520, so that the vehicle drive connector pins 1524 are pulled into the charging receptacle sleeves 1510 when the charging connector 1500 is not mated with the charging receptacle 1508.

Also mounted on the support substrate 1522, or integrated with the charging receptacle 1508, are signal pin contacts 1540, which electrically connect to the signal pins of the charging connector 1500 when the charging connector 1500 is plugged into the charging receptacle 1508. In the exemplary embodiment shown, there are four signal pin contacts 1540. Two of the signal pin contacts allow the charger or other electrical device to access the battery mounted monitor and controller of the battery pack when the charging connector 1500 is mated with the charging receptacle 1508. The other two signal contacts allow an interlock redundancy function, whereby the charger is prevented from supplying a voltage to the assembly unless the charging connector 1500 is properly engaged with the charging receptacle 1508 and/or until an operator permits the charger to supply the voltage once the connector 1500 is properly engaged with the receptacle 1508.

Figure 15D:
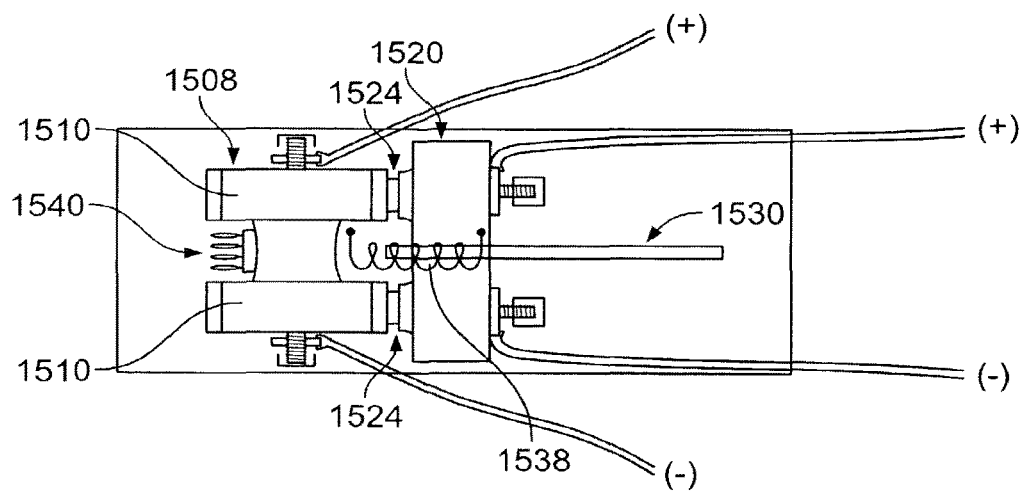

FIG. 15D shows the charging and motor controller isolation assembly when the charging connector 1500 is not plugged into the receptacle 1508. In this configuration, the charging and motor controller isolation assembly allows the battery pack voltage of the vehicle to be applied to the motor controller so that the vehicle can be driven. One or more springs 1538, or other actuating device(s), pulls the vehicle drive connector pins 1524 into the receptacle sleeves 1510. This allows the electrically conducting surfaces of the receptacle sleeves 1510 to be in electrical contact with the electrically conducting portions of the vehicle drive connector pins 1524.

Figure 15E:
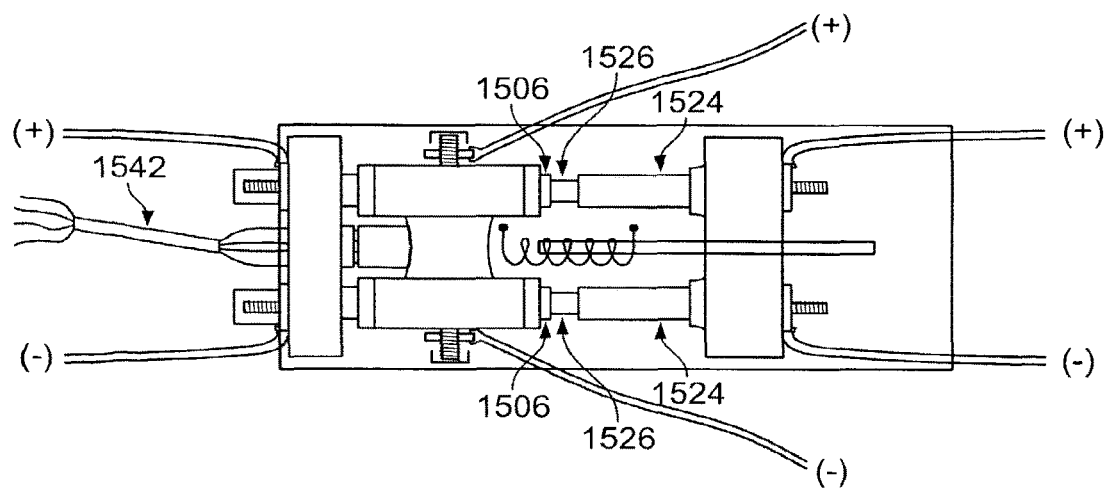

FIG. 15E shows the charging and motor controller isolation assembly when the charging connector 1500 is mated with the charging receptacle 1508. In this configuration, the vehicle cannot be driven until the charging connector 1500 is unplugged from the charging receptacle 1508, and the motor controller is protected from high voltages from the fast charger during fast charging. Electrically conducting surfaces of the vehicle drive connector pins 1524 are entirely removed from the charging receptacle sleeves 1510. Hence, the conducting portions of the vehicle drive connector pins 1524 are electrically isolated from the battery pack and charger. The end portions 1526 of the vehicle drive connector pins 1524 are also electrically isolated from the end portions 1506 of the charging connector pins 1504 since the end portions of both connectors are covered with an electrically insulating material. Accordingly, the vehicle drive connector 1520 is completely isolated electrically from the battery pack and faster charger and, consequently, the motor controller of the vehicle is electrically isolated from the battery pack and charger. It should also be mentioned that, although not shown in the drawing a catching mechanism of some sort is affixed to the assembly to ensure that the charging connector 1500 and charging receptacle 1508 are held in place after mating.

Figure 16:
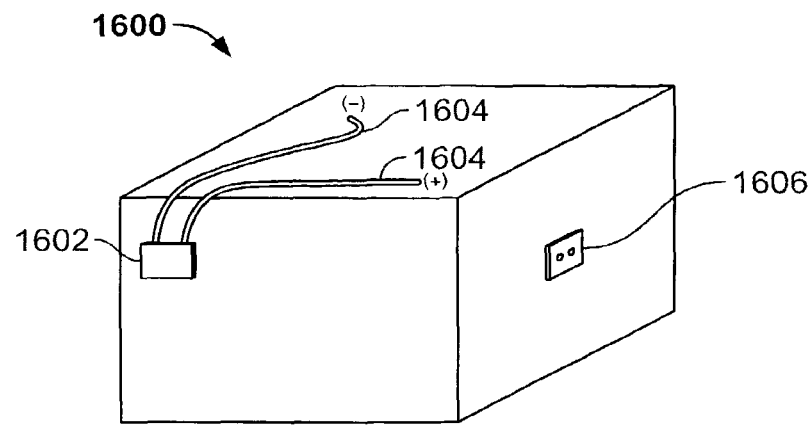
FIG. 16 shows a conceptual view of an integrated battery unit (IBU) containing the charging and motor controller isolation assembly described in FIG. 15, according to an embodiment of the present invention.

To provide a fully integrated battery pack solution, the charging and motor controller isolation assembly in FIG. 15 and/or the thermal and ventilation management concepts described in FIGS. 5-13 above can be integrated into the battery pack or battery pack case, thereby forming an integrated battery unit (or "IBU"). FIG. 16 shows, for example, how an operator would perceive such an IBU 1600 containing the charging and motor controller isolation assembly described in FIG. 15. The IBU 1600 is shown to have a conventional vehicle connector 1602, which is connected to positive and negative terminals of the IBU 1600 via battery cables 1604. The IBU 1600 also contains a charge port 1606, which is coupled to the charging and motor controller isolation assembly described in FIG. 15. The charging and motor controller isolation assembly is hidden (although not necessarily) from view. All that is seen by an operator is the charge port 1606, which is configured to receive a charging connector like that shown in FIG. 15A or similar charging connector.

Figure 17:
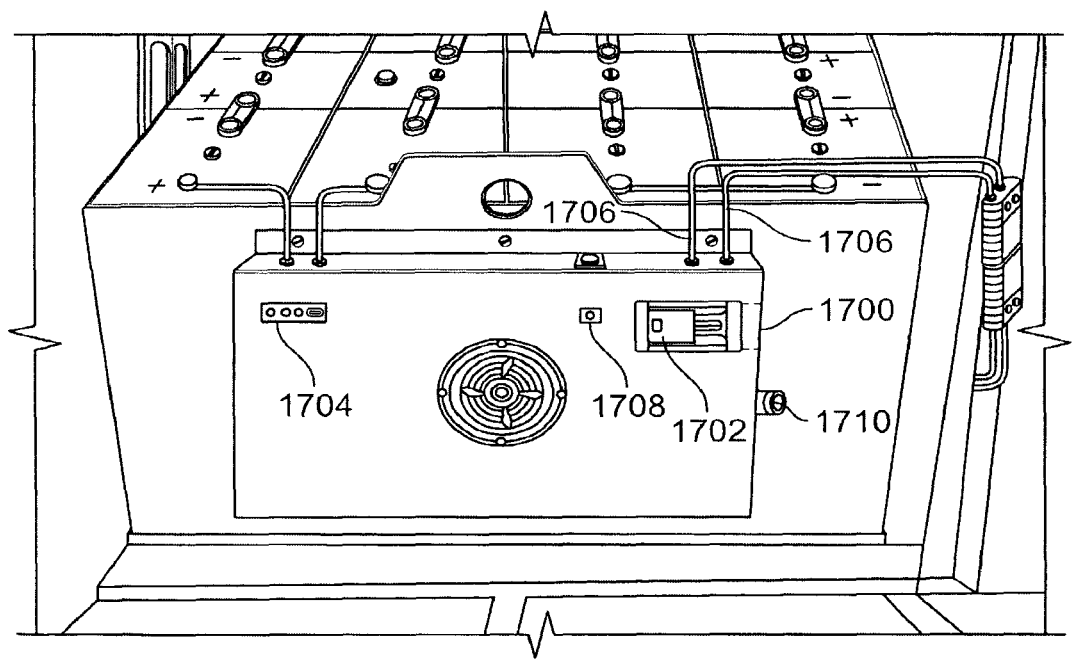
FIG. 17 shows an alternative embodiment of an IBU, according to an embodiment of the invention.

FIG. 17 is a perspective drawing of an alternative embodiment of an IBU, according to an embodiment of the invention. According this embodiment, the battery pack thermal and ventilation management system (similar to that shown in FIGS. 12 and 13) is housed in a fan box, together with one or more of the following: a charge port 1700, charge port connected/unconnected indicator ("Euro-connector" shown in "drive" position) 1702, battery mounted monitor and controller status indicator 1704, motor controller connection cables 1706, and connector status LED 1708. The integration is simple enough that the IBU can be added to an existing vented tray in the field if necessary.

The thermal and ventilation management system may be mounted to an end of the battery tray holding the battery pack or may be mounted directly onto the battery pack. In either alternative the fan housing (i.e. "fan box") is designed so that it does not exceed the battery compartment "protection" zone.

When a charger connector is plugged into the charge port 1700, the drive system is automatically disabled to prevent drive-aways that could possibly damage the charging cables and/or charger. As explained above, the motor controller (i.e. drive system) disconnect can be effected by a mechanical disconnect system (e.g. like that shown in FIGS. 14 and 15 above), a contactor, relay or other suitable means. The IBU may also have an integrated lockout/tag out provision 1710 to prevent the vehicle from being driven or the battery pack from being charged while the vehicle is being serviced.

The battery mounted monitor and controller status indicator 1704 may be used to display battery state of charge (SOC), battery temperature, water level, faults, maintenance requirements, battery historical information, etc. While show as being integrated within the fan housing, the display could also or alternatively be mounted remotely (e.g. on the vehicles dash). The battery mounted monitor and controller itself may also be included within the IBU to provide the brains for communicating with the charger, controlling fan operation, activating/deactivating the watering solenoid valve, enabling/disabling the drive system, and providing status information to a display and/or vehicle controls. A diagnostic port may also be provided and integrated within or on the IBU so that the battery mounted monitor and controller historical and maintenance information can be easily downloaded. Finally, but not necessarily lastly, the IBU may also include a "shock" type of auto disconnect that could disable the drive system if the vehicle had a high enough shock incident (e.g. such as hitting a column, rack or wall).

Figure 18:
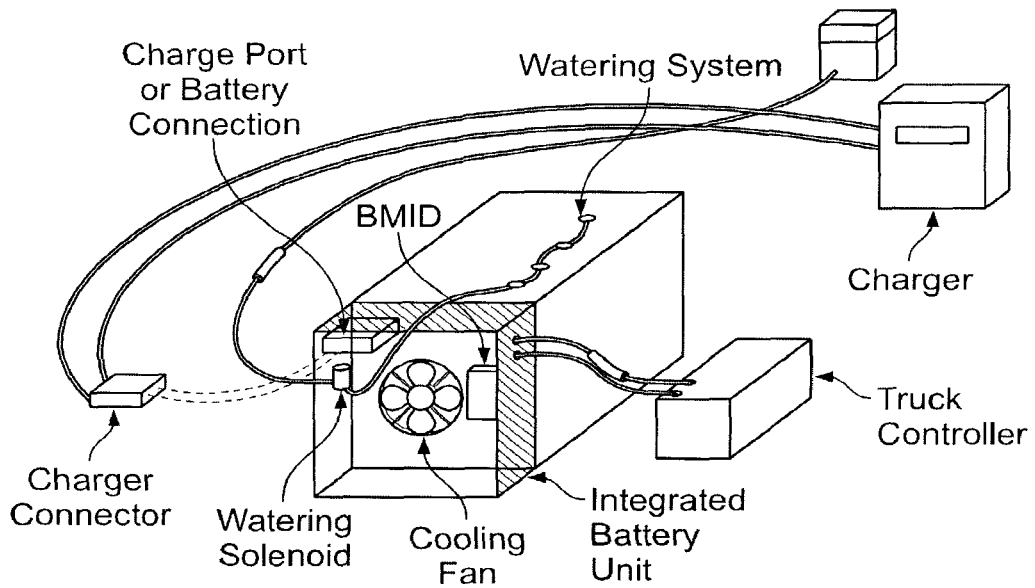
FIG. 18 shows a second perspective drawing of the IBU shown in FIG. 17, and how the IBU may also contain a watering solenoid valve to control water flow into the cells of the battery pack.

FIG. 18 is a second perspective drawing of the IBU shown in FIG. 17. In addition to the other integrated components described in connection with FIG. 17, the IBU may also include a watering solenoid valve 1800 that may be configured to control the flow of water into the cells of the battery pack.

Figure 19:
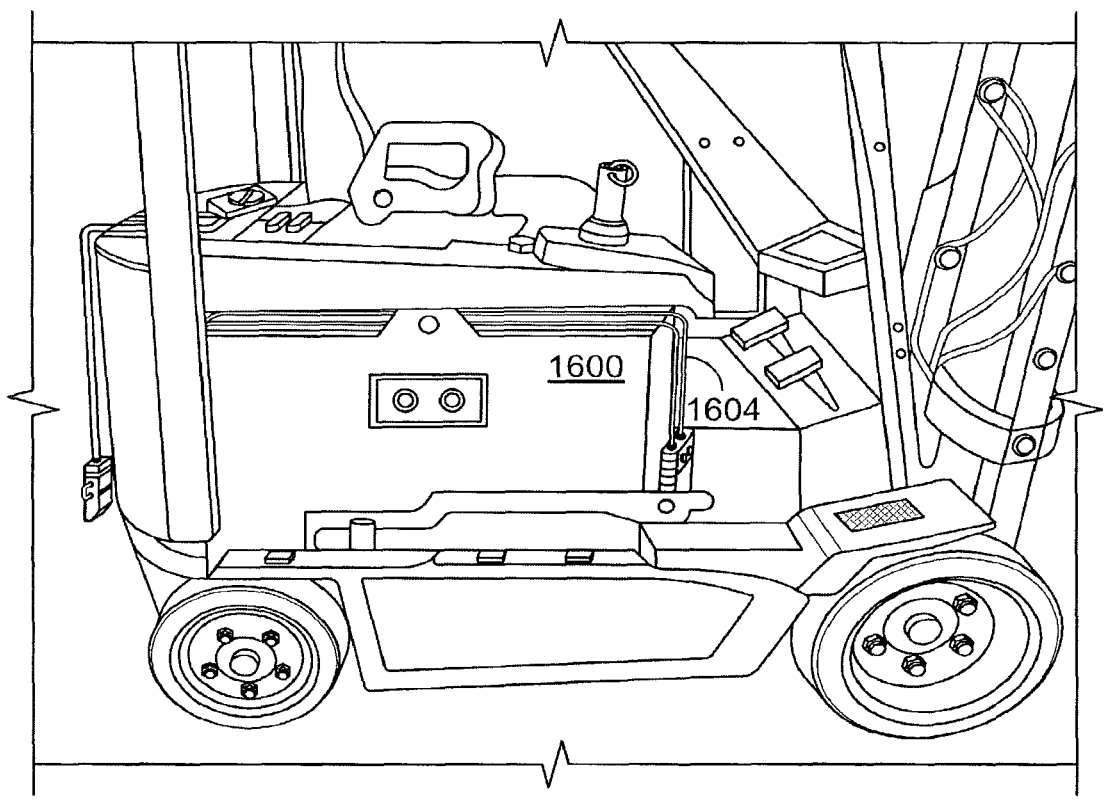
FIG. 19 illustrates how the integrated battery unit (IBU) in FIG. 16, 17 or 18 may be installed in an electric vehicle, according to an embodiment of the present invention.

FIG. 19 illustrates how the IBU in FIG. 16, 17 or 18 may be installed in an electric vehicle. The IBU is open to the air, and the charge port is arranged so that an operator can easily access it to plug in and unplug a charging connector. The IBU, which as mentioned above may also contain the thermal and ventilation management systems described above in connection with FIGS. 5-11 or 12 and 13, can be installed in the electric vehicle without having to make any modifications to the electric vehicle. Further, the vehicle connector remains connected at all times, i.e., during charging and during operational use. If for some reason the battery pack needs to be removed (e.g. when the battery pack has come to the end of its usable lifetime), the only operation that needs to be performed before removing the IBU is the unplugging of the vehicle connector.

While particular embodiments of the present invention have been shown and described, it will be obvious to those skilled in the art that, based upon the teachings herein, changes and modifications may be made without departing from this invention and its broader aspects. Accordingly, the appended claims are intended to encompass within their scope all such changes and modifications as are within the true spirit and scope of the described inventions.

What is claimed is:

1. An integrated battery unit (IBU) for coupling a battery pack to an electric battery charger, the battery pack having one or more battery cells for providing power to the electric vehicle by way of a motor controller coupled to the IBU through controller connection cables, the IBU comprising:
   battery connection cables electrically connecting the IBU to the battery pack;
   a housing for attachment to the battery pack and accommodation in a battery compartment in the electric vehicle in which the battery pack is removably disposed;
   a connector for removably coupling the controller connection cables to the IBU; and
   a disconnector disposed in the housing and including a charging receptacle in communication with the exterior of the housing, the charging receptacle electrically connected to the battery connection cables and operable to electrically isolate the vehicle motor controller from the battery charger when the battery charger is mated to the charging receptacle for fast charging the battery pack.

2. The IBU of claim 1, wherein the disconnector is an electrical contactor or a mechanical disconnect.

3. The IBU of claim 1, further comprising a charge port, coupled to the charging receptacle, for coupling the IBU to the battery charger.

4. The IBU of claim 1, further comprising a thermal and ventilation management system, including at least one fan for cooling the battery pack.

5. The IBU of claim 4, further comprising a battery mounted monitor and controller for controlling fan operation.

6. The IBU of claim 5, wherein the battery mounted monitor and controller is operable to run the fan in forward and reverse directions.

7. The IBU of claim 4, further comprising a temperature sensor for driving operation of the at least one fan.

8. A method for modifying a battery pack of an electric vehicle, the battery pack including one or more battery cells that are rechargeable by a battery charger and operable to deliver power to the electric vehicle by way of a motor controller through controller connection cables, comprising:
   coupling to the battery pack an integrated battery unit (IBU), the IBU including:
      battery connection cables for electrically connecting the IBU to the battery pack;
      a housing for attachment to the battery pack and accommodation in a battery compartment in the electric vehicle in which the battery pack is removably disposed;
      a connector; and
      a disconnector disposed in the housing and including a charging receptacle in communication with the exterior of the housing, the charging receptacle electrically connected to the battery connection cables and to the connector; and
   removably connecting the connector to the controller connecting cables; and
   using the disconnector to electrically isolate the vehicle motor controller from the battery charger when the battery charger is mated to the charging receptacle for fast charging of the battery pack.

9. The method of claim 8, wherein the disconnector is an electrical contactor or a mechanical disconnect.

10. The method of claim 8, wherein the IBU further comprises a charge port, coupled to the charging receptacle, for coupling the IBU to the battery charger.

11. The method of claim 8, further comprising using a thermal and ventilation management system, including at least one fan for cooling the battery pack.

12. The method of claim 11, further comprising using a battery mounted monitor and controller for controlling fan operation.

13. The method of claim 12, further comprising using the battery mounted monitor and controller to run the fan in forward and reverse directions.

14. The method of claim 11, further comprising using a temperature sensor for driving operation of the at least one fan.

* * * * *